United States Patent [19]

Santen et al.

[11] 4,362,555

[45] Dec. 7, 1982

[54] METHOD AND APPARATUS FOR MANUFACTURING SPONGE IRON

[75] Inventors: Sven Santen; Börje Johansson, both of Hofors, Sweden

[73] Assignee: SKF Steel Engineering Aktiebolag, Hofors, Sweden

[21] Appl. No.: 241,397

[22] Filed: Mar. 6, 1981

[51] Int. Cl.³ .......................... C22B 13/02; F27B 1/08
[52] U.S. Cl. .......................................... 75/11; 48/65; 48/202; 48/210; 75/35; 266/140; 266/156; 373/24
[58] Field of Search ............... 48/202, 210, 65; 75/34, 75/35, 11; 266/140, 156; 373/18, 22, 24

[56] References Cited
U.S. PATENT DOCUMENTS

| | | | |
|---|---|---|---|
| 3,853,538 | 12/1974 | Nemeth | 75/35 |
| 4,072,502 | 2/1978 | Santen et al. | 373/18X |
| 4,141,694 | 2/1979 | Camacho | 48/65 |

Primary Examiner—M. J. Andrews
Attorney, Agent, or Firm—Brumbaugh, Graves, Donohue & Raymond

[57] ABSTRACT

Disclosed are a method and apparatus for manufacturing sponge iron by the continuous reduction of iron oxides in a shaft utilizing recirculation gases. Reaction gas is removed from the shaft furnace, substantially cleaned of all $CO_2$ and $H_2O$, and then divided into at least two flow portions one of which is passed to a gas generator comprising a gas generating shaft substantially filled with a solid reducing agent and a plasma burner arranged in the lower portion of said shaft. An oxidant is injected into the hot gas from the plasma burner so as to form a gas mixture comprised primarily of CO and $H_2$, which gas mixture is then mixed with the other flow portion of the cleaned reaction gas in such proportion that the temperature of the resulting reduction gas is suitable for the reduction of iron oxides in the shaft furnace.

21 Claims, 1 Drawing Figure

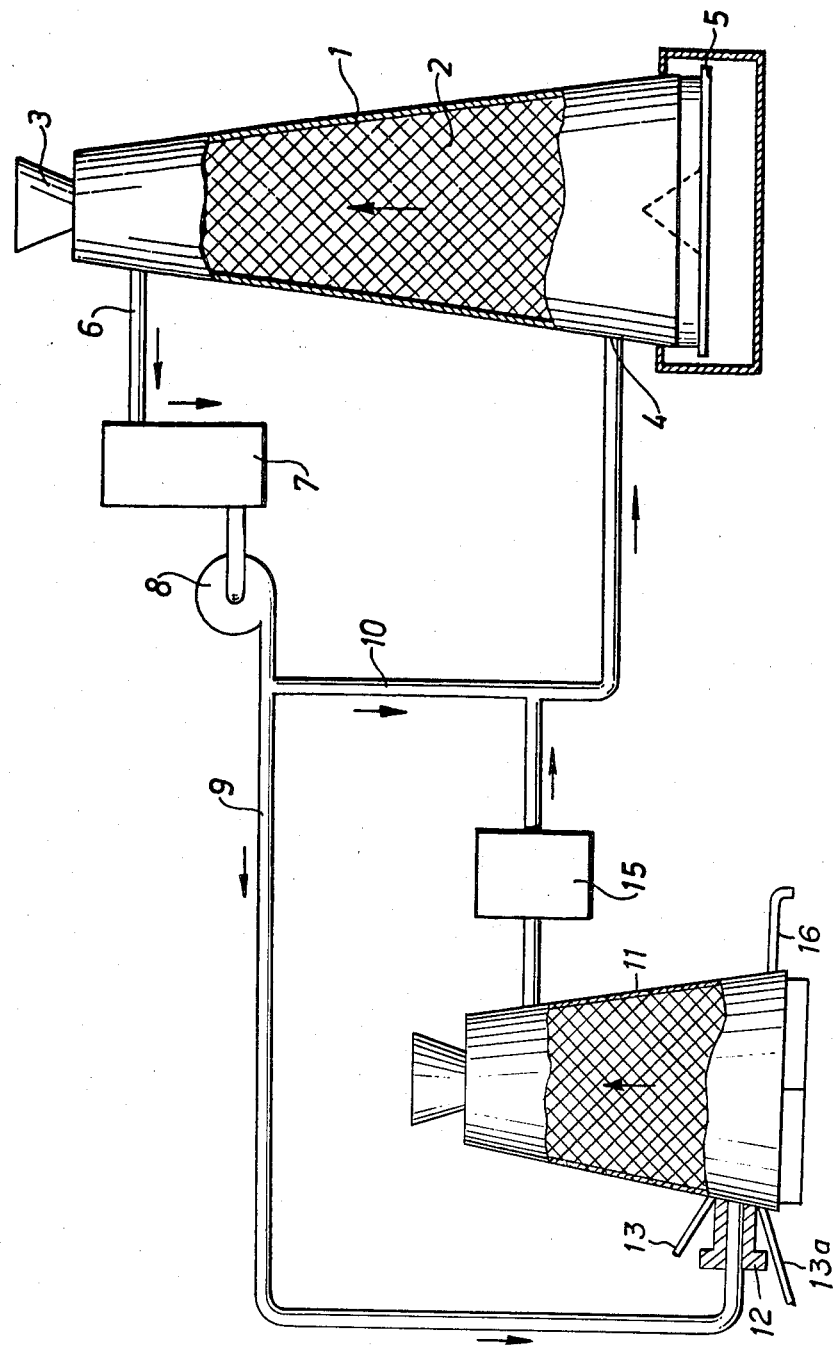

METHOD AND APPARATUS FOR MANUFACTURING SPONGE IRON

BACKGROUND OF THE INVENTION

Conventional processes for the manufacture of sponge iron in which a solid reducing agent, such as coke, is used as a reducing agent are primarily the following:

a. The rotary furnace method in which pit coal is used together with the ore to be reduced, in an inclined rotary furnace. The difficulty with this method is that, mainly due to kinetic energy, it is necessary to work with relatively high temperatures, preferably 1000° C., which causes considerable problems with clogging and the accumulation of material in the reaction chamber.

b. The use of a shaft furnace combined with equipment for gassification of coal, which is based on partial combustion. The drawback with this known method is primarily the extremely high investment cost for the gassification equipment and also the exceptionally high energy consumption.

c. The method, such as is disclosed in Swedish Pat. No. 73 04 332-5, of directly gassifying coal in solid form using a plasma generator. The drawbacks of this method are that the supply of coal must be extremely accurately adjusted and for some grades of coal there are problems in handling the ash. Moreover, the gas produced has a hydrogen content which is lower than the ideal for reduction purposes.

BRIEF SUMMARY OF THE INVENTION

It has now been found that the above difficulties and drawbacks with the known processes can be substantially eliminated according to the present invention. This invention is directed to a method and apparatus for manufacturing sponge iron by the continuous reduction of iron oxides in a shaft furnace. A reduction gas is passed counter-current to the iron oxides and consists primarily of CO and $H_2$, the reduction gas being produced from recirculation gas, i.e. reaction gas leaving the shaft furnace as well as an extra gas produced from solid reducing agent with the help of a plasma generator. The recirculation gas is first substantially cleaned from $CO_2$ and $H_2O$, whereupon the gas thus cleaned is divided into two portions, one of which is passed to a plasma generator. The plasma generator is comprised of a gas generating shaft substantially filled with a solid reducing agent such as coke or the like. A plasma burner is arranged in the lower portion of the generating shaft and water and/or oxygen gas is injected into the hot gas flow leaving the plasma burner so that the water and/or oxygen gas is caused to react with the reducing agent to form a mixture of primarily CO and $H_2$. The temperature level of the gas produced is kept within such a range that ash included in the solid reducing agent forms a slag. The hot $CO-H_2$ mixture leaving the gas generator is mixed with at least some of the other flow portion of the cleaned recirculation gas in such proportion that the temperature of the final gas mixture is suitable for the reduction process.

According to one embodiment of the invention, the temperature level of the gas produced in the gas generating shaft is adjusted to a temperature range of 1300°–1500° C. It is also preferable, before the final gas mixture is provided to the lower part of the shaft furnace, for its temperature to be brought to within the range 700°–1000° C. by mixing it with the second flow portion.

According to another embodiment of the invention the recirculation gas is cleaned in a gas wash until its content of $CO_2$ is preferably below 2%.

The invention is also directed to an apparatus for the manufacture of sponge iron comprising a generating system for reduction gas which includes a cleaning means for the reaction gas leaving the reaction chamber and a gas-generating shaft connected thereto for receiving a portion of the cleaned reduction gas thus obtained. The gas-generating shaft is provided with a plasma burner in the lower portion thereof and is adapted to be substantially filled with a solid reducing agent such as coke. Supply means are provided for the controlled introduction of water and/or oxygen gas as well as, optionally, additional reducing agent in powder form into the plasma gas produced by the burner. An adjustable mixer is provided downstream of the gas-generator shaft to mix the portion of the reduction gas from the shaft with a second, untreated portion of the cleaned reaction gas. Also provided are blowing means in the lower section of the reaction chamber for the introduction of the final gas mixture thus obtained.

BRIEF DESCRIPTION OF THE DRAWING

For a better understanding of the invention, reference may be made to the following description of an exemplary embodiment taken in conjunction with the single FIGURE of the accompanying drawing which illustrates diagrammatically a mode of carrying out the invention.

DESCRIPTION OF THE PREFERRED EMBODIMENT

The reduction of chunks of iron oxide is performed in a reduction shaft 1. The chunks of iron oxide 2 are fed through a sluice valve 3 into the shaft 1 and treated by a counter-current flow of a hot reduction gas consisting primarily of carbon monoxide and hydrogen gas introduced at the lower section 4 of the shaft 1. The sponge iron product is removed through an outlet 5 in the bottom 4 of the shaft 1. The reduction gas, 30% to 50% of which has been reacted, is removed from the upper part of the shaft 1 through an outlet 6.

The gas thus removed from the shaft 1, besides containing from 50% to 70% unreacted CO and $H_2$, also contains the reaction products $CO_2$ and $H_2O$. Since this gas still contains relatively high percentages of CO and $H_2$, it is re-usable in the process. However, to enable it to be re-used as reduction gas, the content of $CO_2$ and $H_2O$ must be reduced to less than 5%. This is achieved by allowing the gas to pass through a wash ($CO_2/H_2O$ wash) 7. When the gas passes through this wash, not only is it freed from the reaction products $CO_2$ and $H_2O$, but the actual washing process enables balancing of the gas quantity so that flaring of the gas can be avoided. The wash 7 may contain mono-ethanol amine, for instance, as active substance and the content of $CO_2$ in the gas can be suitably reduced to below 2% upon passage through the wash.

After the wash 7 the gas passes a compressor 8 to achieve the pressure increase necessary for the process and is then divided into at least two flow portions 9, 10.

The flow portion 9, which is at room temperature, is passed into a gas generator 11 where the necessary extra gas is generated from a solid reducing agent, preferably coke, and water and/or oxygen gas. The gas flow 9 is used as plasma gas in a gas generator 11 and the quantity of energy necessary for the gas generating process is supplied in a plasma burner 12. The gas generator 11 is substantially filled with a solid reducing agent, preferably coke. An oxidant, preferably water and/or oxygen gas, is supplied to the gas generator 11 through jets 13 so that it penetrates the hot gas flow leaving the plasma burner 12. Extra reducing agent may optionally be added, for example in powder form through injector means 13a. This additional reducing agent is preferably coal dust having a particle size below 20 mesh and preferably below 100 mesh. The hot gas flow from the plasma burner is thus caused to act upon the reducing agent and form CO and $H_2$.

The supply of energy in the gas generator 11 is regulated so that the ash existing in the coal dust is melted to a slag 14 which can be removed from the lower part of the gas generator 11 in liquid or solid form via tapping means 16. Due to the composition of the ash, the temperature is preferably selected to be within the range 1300°–1500° C.

The reduction gas produced in the apparatus, besides containing CO and $H_2$, may also contain sulphur from the reducing agent. This intermediate gas mixture is therefore caused to pass a sulphur filter 15 (e.g. a dolomite filter) where the sulphur content is reduced to an acceptable level for the sponge iron process, preferably below 75 ppm.

According to an alternative embodiment of the invention, the sulphur filter 15 may be built into the gas generator itself, by providing the coke bed with suitable material for the purpose.

The gas leaving the sulphur filter 15 is at a temperature substantially in excess of that required for the sponge iron process and the temperature is therefore lowered by mixing in a suitable portion of the cold, washed gas in the flow portion 10 to yield a temperature suitable for the process—e.g. 750°–1000° C., preferably 825° C. While separate mixing means can be used to mix the gas from the gas generator and the flow portion 10, it is also possible to introduce part or all of the flow portion 10 into the top of the gas generator 11 such that the gas generator is used as a mixing chamber.

Substantial technical advantages are obtained utilizing the method and apparatus according to the invention. In this regard, the gas generator can take place at a temperature such that the ash forms slag which is easy to handle and which can be tapped off without causing clogging problems in the process. The hydrogan content in the reduction gas can be adjusted to an amount suitable for the reduction process by means of the washing process and subsequent injection of water and/or oxygen gas into the gas generator. Furthermore the combination of gas washing and gas generation at increased temperatures offers superior possibilities of balancing the quantity of gas in the system and regulating the reduction temperature. At the same time, energy efficiency is achieved since the energy supplied by the plasma-generator is substantially completely used in the process (i.e. temperature adjustment is accomplished by adding cooler recycled reduction gas rather than by removing heat from the system).

Should difficulties arise in binding the ash from the solid reducing agent in a slag phase, additives affecting the properties (e.g. melting point, sulphur absorption, etc.) of the slag may be used, such as alkali compounds and chalk. These additives are preferably mixed with the solid reducing agent.

We claim:

1. A method of manufacturing sponge iron by the continuous reduction of iron oxides in a shaft furnace comprising the steps of:
    (1) removing the reaction gas from a shaft furnace;
    (2) removing from said reaction gas substantially all $CO_2$ and $H_2O$;
    (3) dividing the reaction gas into at least two flow portions;
    (4) passing one of said flow portions to a gas generator comprising a gas generating shaft substantially filled with a solid reducing agent, a plasma burner arranged in the lower portion of said shaft, and means for injecting oxidant, and heating said reaction gas by said plasma burner and injecting into the heated gas from the plasma burner an oxidant so as to form an intermediate gas mixture comprised primarily of CO and $H_2$;
    (5) maintaining said intermediate gas mixture at a temperature such that ash contained within the solid reducing agent forms a slag;
    (6) mixing said intermediate gas with at least one of said other flow portions in such proportion that the temperature of the resulting reduction gas is suitable for the reduction of iron oxides in a shaft furnace;
    (7) injecting said reduction gas into the lower portion of a shaft furnace and passing said reduction gas upwardly through said shaft furnace so as to reduce iron oxides contained in said furnace; and
    (8) removing from said furnace the reduced iron.

2. A method according to claim 1 wherein said oxidant is water or oxygen.

3. A method according to claim 2 including the step of maintaining the intermediate gas mixture at a temperature between about 1300° and 1500° C.

4. A method according to claim 3 wherein said intermediate gas is mixed with said at least one other flow portion in such a proportion that the temperature of the resulting reduction gas prior to injection into the shaft furnace is between about 700° and 1000° C.

5. A method according to claim 4 wherein the temperature of the reduction gas prior to injection into the shaft furnace is approximately 825° C.

6. A method according to claim 1 wherein the $CO_2$ and $H_2O$ is removed from the reaction gas by means of a gas wash until the content of $CO_2$ is less than about 2%.

7. A method according to any one of claims 1–6 wherein said reducing agent is coke.

8. A method according to any one of claims 1–6 wherein additional reducing agent is injected into the heated gas from the plasma burner.

9. A method according to claim 8 wherein said additional reducing agent is coal dust having a particle size below 20 mesh.

10. A method according to claim 9 wherein said additional reducing agent is coal dust having a particle size below 100 mesh.

11. A method according to any one of claims 1–6 including the step of passing said intermediate gas mixture through a sulphur filter.

12. Apparatus for the manufacture of sponge iron by the continuous reduction of iron oxides comprising:
    (1) a shaft furnace for the reaction of iron oxides by a reduction gas comprised primarily of CO and $H_2$;

(2) means connected to the upper portion of the shaft furnace for removing reaction gas from the furnace;

(3) cleaning means for the removal of $CO_2$ from said reaction gas;

(4) means for separating the cleaned reaction gas into at least two flow portions;

(5) a gas generator for receiving at least one of said flow portions, said gas generator comprising a gas generating shaft substantially filled with a solid reducing agent, a plasma burner arranged in the lower portion of said shaft, and means for injecting oxidant into the gas heated by said plasma burner thereby to produce an intermediate gas mixture comprised primarily of CO and $H_2$;

(6) mixing means for the controlled mixing of said intermediate gas mixture with at least one of the other flow portions of the reaction gas thereby to obtain a reduction gas; and (7) means for injecting said reduction gas into the lower portion of the shaft furnace.

13. Apparatus according to claim 12 wherein the cleaning means comprises a $CO_2$ wash.

14. Apparatus according to claim 13 wherein the $CO_2$ wash contains mono-ethanol amine as the active agent.

15. Apparatus according to claim 12 including a compressor located between the cleaning means and the means for separating the cleaned reaction gas.

16. Apparatus according to any one of claims 12–15 wherein said gas generator is provided with means for removing slag.

17. Apparatus according to any one of claims 12–15 including a sulphur filter between the gas generator and the mixing means.

18. Apparatus according to any one of claims 12–15 wherein a sulphur filter is incorporated in the gas generator.

19. Apparatus according to any one of claims 12–15 including means for injecting additional reducing agent in powder form into the heated gas from the plasma burner.

20. Apparatus according to claim 19 wherein the means for injecting solid reducing agent has an injection area immediately in front of the plasma burner.

21. Apparatus according to any one of claims 12–15 wherein the means for injecting oxidant has an injection area immediately in front of the plasma burner.

* * * * *